United States Patent [19]
Keuper et al.

[11] 3,943,392
[45] Mar. 9, 1976

[54] COMBINATION SLOT LINER AND RETAINER FOR DYNAMOELECTRIC MACHINE CONDUCTOR BARS

[75] Inventors: John J. Keuper, Cold Spring, Ky.; Paul D. Wagner, Cincinnati, Ohio

[73] Assignee: Allis-Chalmers Corporation, Milwaukee, Wis.

[22] Filed: Nov. 27, 1974

[21] Appl. No.: 527,809

[52] U.S. Cl. ............................................. 310/215
[51] Int. Cl.² ........................................ H02K 3/36
[58] Field of Search ............ 310/214, 215, 217, 218, 310/45, 43, 254, 258, 261, 264, 42, 43; 336/196–198

[56] References Cited
UNITED STATES PATENTS

| | | | |
|---|---|---|---|
| 1,320,126 | 10/1919 | Dudley | 310/214 |
| 1,396,525 | 11/1921 | Pieper | 310/214 |
| 2,400,576 | 5/1946 | Sigmund | 310/45 |
| 3,444,407 | 5/1969 | Yates | 310/215 |
| 3,505,729 | 4/1970 | Balke | 310/45 |
| 3,621,315 | 11/1971 | Dalmo | 310/214 |
| 3,646,374 | 2/1974 | Jordan | 310/45 |
| 3,750,273 | 8/1973 | Beddows | 310/45 |
| 3,824,683 | 7/1974 | Rhudy | 310/45 |

*Primary Examiner*—R. Skudy
*Attorney, Agent, or Firm*—John P. Hines

[57] ABSTRACT

A U-shaped slot liner is provided with a porous spongy longitudinal rib on each leg. The ribs mate with complementary grooves in the dynamoelectric machine coil slot, side walls and the conductor bar side walls. When the assembled machine element is impregnated by a thermosetting liquid, the ribs absorb the liquid and become hard when heated.

1 Claim, 2 Drawing Figures

COMBINATION SLOT LINER AND RETAINER FOR DYNAMOELECTRIC MACHINE CONDUCTOR BARS

This invention pertains in general to dynamoelectric machines and more particularly to means for both insulating and retaining the conductor bars or coil sides of such machine rotors and stators fixed within their winding slots.

Various means have, in the past, been employed to retain the coils of motors and other electrical equipment fixed within the slots of rotors or stators, such means being known commonly as slot wedges or closures which usually take the form of flat pieces of glass, fabric, wood, fiber, paper and the like. In some instances, such wedges are made in the form of channels which, after implacement of the coil sides, are slid through the slot over the coil side to prevent migration of the coil out of the slots before varnish treatment of the windings and later during operation of the machine. In some instances, the wedging function is combined with the so-called slot cells which may be in the form of sheet insulation which serves to line the complete slot.

These known modes for securing and insulating the conductors in the motor slots do not, in many instances, permit locating the tops of the conductors very close to the gap between the stator and rotor. This is usually due to the thickness of the wedges and the height of the attachment means of the wedges to the slot. Consequently, the conductors remain recessed in the stator or rotor slots relatively far away from the inner surface of the gap between the stator and rotor.

When current flows through the conductors, a fairly large number of flux lines is formed directly around the conductors without traversing the air gap and consequently without producing a flux linkage with the conductors of the other motor element. This results in a rather high value of leakage reactance. In certain cases of alternating current machines where particular operating conditions are sought, it can be useful to reduce the leakage reactance to a small value. For this it is necessary to bring the conductors as near as possible to the zone where the energy exchange occurs, i.e., at the gap between the rotor and the stator.

Furthermore, heat dissipation can be a problem if the slot wedge causes the top of the conductor bar to be spaced any significant distance from the air gap. Considerably more heat can be dissipated by positioning the conductor bar as close to the air gap as possible and by exposing as much of the conductor bar as possible to the air gap.

It is the intention and general object of this invention to provide a slot liner which both insulates and holds the conductor bars in the slots and which permits location of the conductor bars very close to the air gap.

An additional object of the subject invention is to provide a slot liner of the hereinbefore described type which permits the surface of the coil side facing the air gap to be uncovered.

A more specific object of the subject invention is to provide a slot liner of the hereinbefore described type which is U-shaped in cross section having longitudinally extending ribs constructed of a spongy porous material which mate with grooves in the conductor bars and in the coil slots and which absorb thermosetting liquid and become hard when heated.

These and other objects of the subject invention will become more fully apparent as the following description is read in light of the attached drawing wherein.

Figure 1:
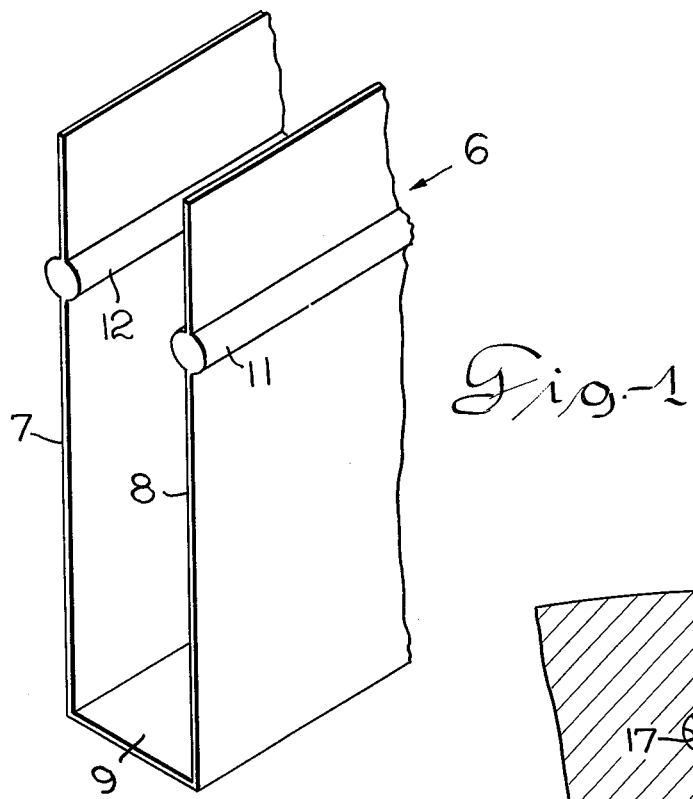
FIG. 1 is a partial isometric view of a slot liner constructed in accordance with the subject invention.

Referring to the drawing wherein like reference characters refer to the same or similar elements, 6 refers generally to the preferred form of slot liner. The slot liner is generally U-shaped in cross section having a pair of spaced legs 7 and 8 connected together by a bottom portion 9. A pair of longitudinally extending ribs 11 and 12 is provided in the legs. The ribs extend along both the inside and outside of each leg 7 and 8.

The slot liner 6 may be constructed of any well known electrically insulating material. Regardless of the type of material utilized, the ribs 11 and 12 must be of a spongy or resilient absorbent material for reasons that will be later apparent. As an example, the ribs may be constructed of felt or braided rope.

Figure 2:
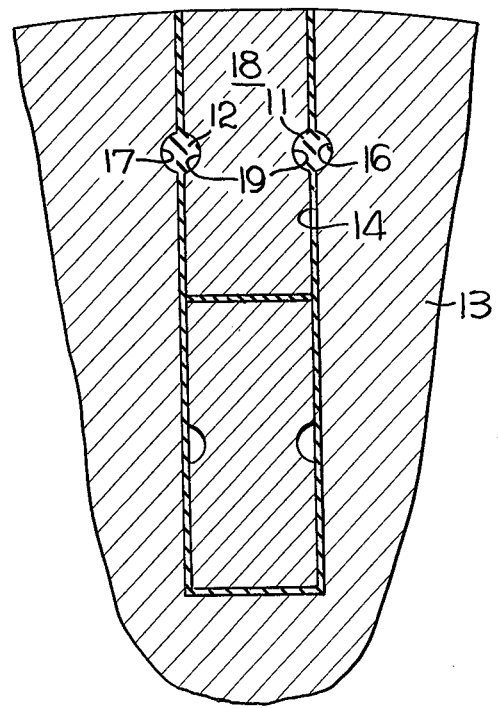
FIG. 2 is a sectional view of a dynamoelectric machine showing the slot liner of FIG. 1 in place.

Referring to FIG. 2, an element of a dynamoelectric machine such as a rotor 13 is shown. The rotor is provided with a plurality of coil slots 14. A pair of longitudinally extending grooves 16 and 17 is provided on the inner surface side walls of the coil slots 14. The slot liner is inserted into the coil slot with the ribs 11 and 12 in the grooves 16 and 17. Due to the spongy or resilient make-up of the ribs, they can be forced into the grooves with ease.

Conductor bars or coil sides 18 are provided with longitudinally extending grooves 19 on each outer side thereof. These grooves are complementary to and align with the ribs 11 and 12 when the coil sides are in place. Here, again, because of the spongy or resilient nature of the ribs, the coil sides can be easily inserted into the slot liner 6.

Once all conductor bars are in place, the machine element is, in any well known manner, impregnated by a thermosetting liquid such as epoxy or polyester. The ribs absorb the liquid and upon exposure to sufficient heat, become hard. Once hardened, both the slot liner and the conductor bars are firmly held in the coil slots 14.

From the above description, it can be seen that an inexpensive slot liner has been provided which permits the conductor bars to be firmly held in the coil slots with the surface of the coil side exposed and positioned closely adjacent to the machine air gap.

The embodiments of an invention in which an exclusive property or privilege is claimed are defined as follows:

1. In a dynamoelectric machine including a core having a plurality of slots defined by side walls for receiving conductor bars, the improvement comprising: longitudinally extending grooves in said side walls; a substantially U-shaped slot liner defined by a pair of spaced legs, said slot liner having a longitudinally extending rib protruding from each side of each of said legs which aligns and mates with said coil slot side wall grooves when said lining is in the operative position; and a longitudinally extending groove in the sides of said conductor bars, said conductor bar grooves being in alignment and mating with said slot liner ribs when they are in the operative position, said slot liner ribs being constructed of a resilient absorbent material which after being impregnated with a thermosetting material and heated will cure and harden to securely hold said liner and conductor bars in said slots.

* * * * *